United States Patent [19]
Singer

[11] 3,932,893
[45] Jan. 13, 1976

[54] SOUND RECORDING AND REPRODUCING APPARATUS

[75] Inventor: Franz Singer, Munich, Germany

[73] Assignee: Compur-Werk Gesellschaft, Munich, Germany

[22] Filed: Sept. 30, 1974

[21] Appl. No.: 510,759

[30] Foreign Application Priority Data
Oct. 23, 1973 Germany............................ 2353021

[52] U.S. Cl. .............................................. 360/130
[51] Int. Cl.² ........................................ G11B 15/60
[58] Field of Search...................... 360/130; 16/142

[56] References Cited
UNITED STATES PATENTS

| | | |
|---|---|---|
| 3,008,012 | 11/1961 | Proctor.............................. 360/130 |
| 3,126,163 | 3/1964 | Knox.................................. 360/130 |
| 3,372,938 | 3/1968 | Hoag.................................. 360/130 |
| 3,682,486 | 8/1972 | Zwetzig et al. ..................... 360/130 |
| 3,698,723 | 10/1972 | Kobler................................ 360/130 |

FOREIGN PATENTS OR APPLICATIONS
603,330   6/1948   United Kingdom.................. 16/142

Primary Examiner—Robert S. Tupper
Attorney, Agent, or Firm—Larson, Taylor & Hinds

[57] ABSTRACT

In sound recording and reproducing apparatus of the magnetic tape type, two pivotal levers of similar form are provided, each with a wing and two guide flanges, arranged in the assembled condition with their guide flanges on a mounting pin and pivotally biased by a torsion spring so that the wings press the magnetic tape against the magnetic heads. Each pivotal lever has an abutment nose which is pressed by the torsion spring surrounding the mounting pin against an abutment surface on the other pivotal lever, such that the two levers, the torsion spring and the mounting pin constitute a group which is a closed system as regards forces and shape. The mounting pin has an intermediate portion of reduced diameter, and the openings in the guide flanges and the torsion spring bear against generally opposite sides of the mounting pin, thus preventing accidental dislodgement of the levers in the longitudinal direction of the mounting pin.

6 Claims, 6 Drawing Figures

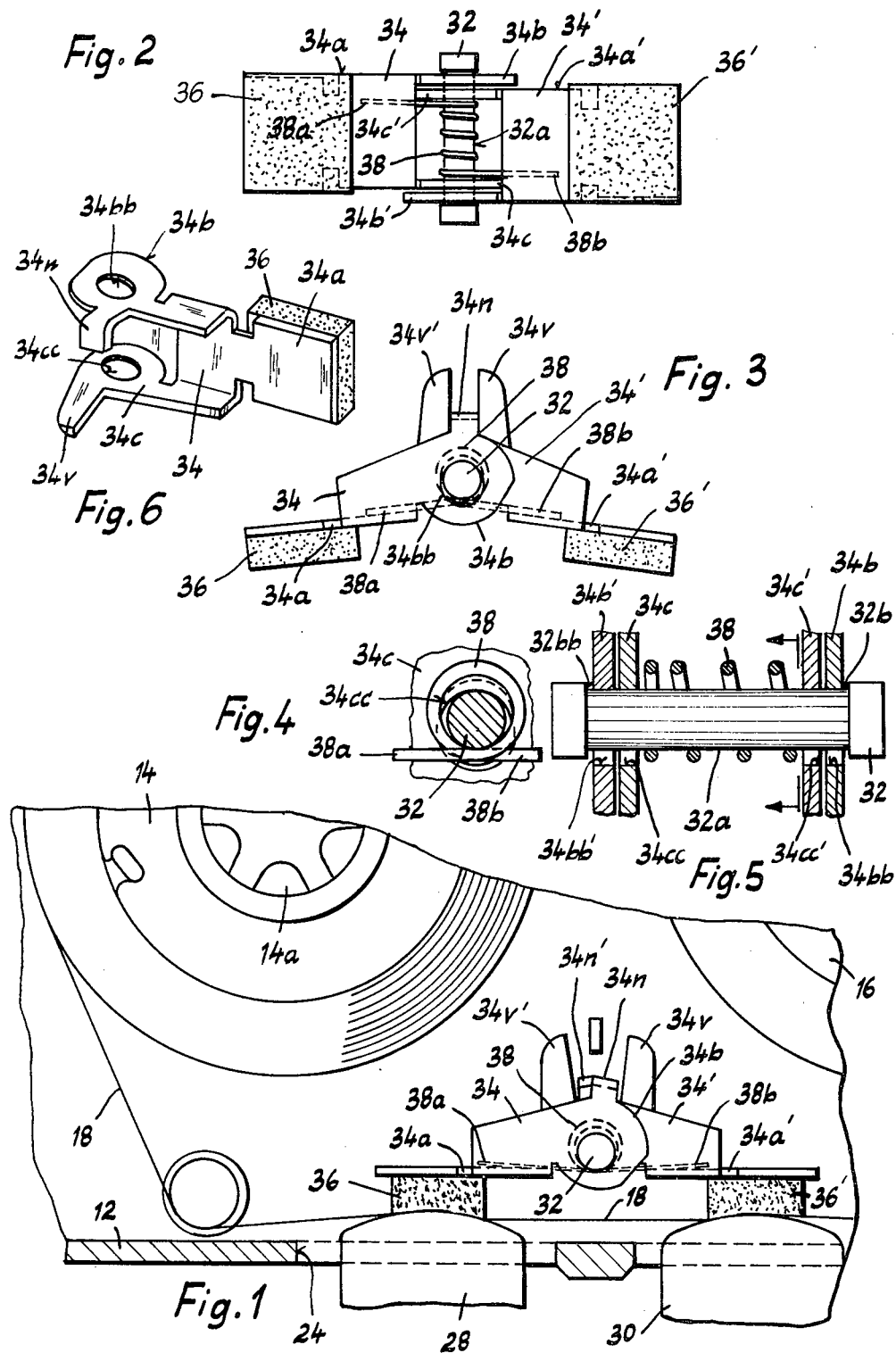

SOUND RECORDING AND REPRODUCING APPARATUS

FIELD, BACKGROUND AND SUMMARY OF THE INVENTION

This invention relates to sound recording and reproducing apparatus of the type utilizing a magnetic tape, wherein two pivotal levers of similar form, each with a wing and two guide flanges, are arranged in the assembled condition with their guide flanges on a mounting pin and biased by a torsion spring so that the wings press the magnetic tape against the magnetic heads of the apparatus. The instant invention is a further development of the apparatus disclosed in my copending application, Ser. No. 361,058, filed May 17, 1973.

It is an object of this invention to secure a considerable simplification of the mounting and assembly of the constructional elements of such an arrangement. This object is achieved in accordance with the present invention by an arrangement wherein each pivotal lever has an additional abutment nose which is pressed by the torsion spring, engaged around the mounting pin, against an abutment surface on the other pivotal lever, whereby the two pivotal levers, the torsion spring and the mounting pin constitute a group which is a closed system as regards forces and shape. The constructional elements can thus be combined into a group as a pre-assembly, which can be mounted in the apparatus in this condition and, when the final assembly takes place, can be introduced and incorporated as a whole in the apparatus or in the cassette of the latter.

In a preferred embodiment of the invention the mounting pin is provided intermediate its ends with a reduced diameter section and with two limit surfaces which are at right angles to the longitudinal axis thereof, each of which constitutes an abutment face for the confronting guide flanges of the pivotal lever concerned. As a result, the elements are held together as a closed system as regards shape and force conditions, even in the longitudinal direction of the mounting pin, and are thereby secured against accidental dislodgement.

DESCRIPTION OF THE DRAWINGS

A preferred embodiment of the invention is illustrated in the accompanying drawings, wherein:

FIG. 1 is a plan view of the guide arrangement in use in a cassette which has been only partially illustrated, FIGS. 2 and 3 are different views of the front group of elements of the guide arrangement, FIGS. 4 and 5 show details of the arrangement on a larger scale, and FIG. 6 is a perspective illustration of a pivotal lever of the guide arrangement.

DESCRIPTION OF A PREFERRED EMBODIMENT

FIG. 1 illustrates in some detail the guide arrangement for the magnetic tape 18 which is anchored to spools 14, 16 and introduced into the cassette 12. The two pivotal levers 34 and 34' are of similar form, are installed on the mounting pin 32 held in the cassette 12, and are biased by torsion spring 38 in such a way that the felt pieces 36, 36' carried by the arms 34a, 34a' of the pivotal levers press the magnetic tape 18 against the magnetic heads 28, 30 of the sound recording and reproducing apparatus when the cassette 12 is inserted in said apparatus. The two guide flanges 34b and 34c, and 34b' and 34c', respectively, of pivotal levers 34, 34' have mounting openings 34bb and 34cc, and 34bb' and 34cc'.

The mounting pin 32 is provided at its central part with a reduced section 32a bounded by two surfaces 32b, 32bb at right angles to the longitudinal axis of the pin 32. As clearly shown by FIG. 3 and FIG. 6, each pivotal lever 34, 34' additionally has a projection or abutment surface 34v or 34v' which is approximately tangential to the pivotal axis thereof, and a nose 34n or 34n' which is turned down parallel to this axis.

In a pre-assembly of the elements described, the mounting pin 32 can be pushed through the openings 34bb, 34cc, 34bb' and 34cc' of the pivotal levers 34 and 34', and through the turns of the torsion spring 38. The ends 38a, 38b of this spring 38 act on the pivotal levers 34, 34' and the mounting pin 32 in such a way that the nose 34n of one lever 34 presses against projection 34v' of the other pivotal lever 34', and that at the same time the openings 34bb, 34cc, 34bb' and 34cc' are applied against one side of the reduction 32a of the bearing pin 32, and the turns of the spring 38 bear against the other side, as best seen in FIGS. 4 and 5. This means that the elements 32, 34, 34' and 38 are non-positively connected to one another to form a constructional unit which can be inserted as a whole during the assembly in the cassette, each of the two ends of the mounting pin 32 being held in a mounting bore in the cassette which has not actually been illustrated in full. FIG. 1 shows this constructional unit mounted in the cassette 12 in position ready for operation.

I claim:

1. In a tape transport mechanism of the type wherein a tape is moved sequentially along signal heads for the reception or reproduction or removal of informational signals, means for guiding and pressing the tape against the signal heads comprising a mounting pin located between the signal heads and on the opposite side of the tape relative to the signal heads, two like-shaped swinging levers each having two guide flanges by which the levers are pivotally journalled on said mounting pin, each swinging lever having a wing portion extending outwardly from said mounting pin and carrying a pad oriented so as to lie generally opposite a respective one of the signal heads for bearing against the tape opposite a respective one of said signal heads, and torsion spring means engaged about the mounting pin for biasing said swinging levers and their wings in respective directions to press the tape against the signal heads, each swinging lever having an abutment nose and an abutment surface so arranged that the abutment nose of one is biased by said torsion spring against the abutment surface of the other to define normal inoperative positions in which the swinging levers are held by the spring when the wing pads are clear of the signal heads, and such that the abutment noses and surfaces are moved away from each other when the wing pads bear against the signal heads to define the operative positions of the swinging levers.

2. Apparatus as claimed in claim 1 wherein the abutment nose and the abutment surface of each lever are carried by different guide flanges of that lever.

3. Apparatus as claimed in claim 1 wherein the mounting pin is provided intermediate its ends with a reduced diameter section and with two limit surfaces which are at right angles to the longitudinal axis thereof, and each limit surface constitutes an axially-limiting abutment face for the confronting guide flange of one of the levers.

4. Apparatus as claimed in claim 3 wherein said torsion spring bears against one side of the reduced diameter section of said mounting pin, and openings in said guide flanges bear against the opposite side, the openings being of larger diameter than the reduced diameter portion of said mounting pin.

5. Apparatus as claimed in claim 4 wherein said torsion spring has a coiled portion about said mounting pin and two arms bearing against respective ones of said levers to urge them pivotally in opposite directions.

6. Apparatus as claimed in claim 5 wherein the coiled portion of said spring lies between the flanges of said swinging levers.

* * * * *